United States Patent [19]

Reginato et al.

[11] 3,936,431

[45] Feb. 3, 1976

[54] PROCESS FOR THE POLYMERIZATION OF OLEFINS AND CATALYTIC PRODUCTS

[75] Inventors: Luigi Reginato, Brussels; Charles Bienfait, Vilvorde; Jacques Stevens, Braine-L'Alleud, all of Belgium

[73] Assignee: Solvay & Cie, Brussels, Belgium

[22] Filed: Mar. 26, 1973

[21] Appl. No.: 344,873

Related U.S. Application Data

[63] Continuation-in-part of Ser. No. 186,764, Oct. 5, 1971, abandoned.

[30] Foreign Application Priority Data

Mar. 28, 1972 Luxemburg............................ 65059

[52] U.S. Cl.......... 260/88.2 R; 252/429 C; 252/430; 260/93.7; 260/94.9 E
[51] Int. Cl.²... C08F 4/02; C08F 4/66; C08F 10/02
[58] Field of Search .. 260/94.9 DA, 94.9 D, 94.9 E, 260/94.9 R, 88.2 B; 252/429 C, 430

[56] References Cited
UNITED STATES PATENTS

| | | | |
|---|---|---|---|
| 2,825,721 | 3/1958 | Hogan et al. | 260/88.1 |
| 3,513,150 | 5/1970 | Matsuura et al. | 260/94.9 D |
| 3,530,077 | 9/1970 | Shepard et al. | 260/94.9 D |
| 3,658,722 | 4/1972 | Delbouille et al. | 260/88.2 B |
| 3,701,766 | 10/1972 | Delbouille et al. | 260/94.9 DA |
| 3,705,886 | 12/1972 | Kashiwa et al. | 260/94.9 DA |

FOREIGN PATENTS OR APPLICATIONS 2,015,592  12/1970  Germany

*Primary Examiner*—Edward J. Smith
*Attorney, Agent, or Firm*—Pennie & Edmonds

[57] ABSTRACT

This invention relates to novel catalysts and cocatalysts for use in the polymerization and copolymerization of α-olefins, to a process for using such catalysts to polymerize and copolymerize α-olefins, and to the process of making such cocatalysts. The α-olefins are polymerized or copolymerized in the presence of a catalytic amount of a catalyst system comprising an organometallic compound of a metal of Groups Ia, IIa, IIb, IIIa, or IVa of the Periodic Table and a cocatalyst comprising the reaction product of a halogenated alumina and a derivative of a transistion metal of Groups IVb, Vb, and VIb of the Periodic Table, said halogenated alumina being formed by halogenating a complex oxide of aluminum and at least one other metal.

8 Claims, No Drawings

PROCESS FOR THE POLYMERIZATION OF OLEFINS AND CATALYTIC PRODUCTS

CROSS-REFERENCE TO RELATED APPLICATION

The instant application is a continuation-in-part of our copending application Serial No. 186,764, filed October 5, 1971 now abandoned.

BACKGROUND OF THE INVENTION

In our prior application Serial No. 186,764, a description is given of a process for the polymerization and copolymerization of $\alpha$-olefins in which the operation is carried out in the presence of a catalytic system comprising an organometallic compound of a metal of Groups Ia, IIa, IIb, IIIa, and IVa of the Periodic Table and a cocatalyst obtained by reacting a halogenated alumina with a certain atomic ratio of halogen/ aluminum and a derivative of a metal of Groups IVb, Vb, and VIb of the Periodic Table.

These catalytic systems make it possible to obtain, with high productivities (of the order of 1500 g. of polymer per gram of catalyst component, for example) polymers which are characterized in particularly high average molecular weights and, therefore, particularly low fluidity indices. The polymers of this type are very suitable for certain particular uses such as the manufacture of large capacity containers. However, for many applications it is preferred to use polymers with lower mean molecular weights and, thus, higher fluidity indices.

The catalytic systems described in our prior application do not make it possible to obtain these polymers with lower molecular weight except by using very substantial relative amounts of modification agent for the molecular weight (hydrogen). But, in this case, we note a very substantial decrease of the productivity of these catalytic systems.

SUMMARY OF THE INVENTION

Novel catalysts, cocatalysts, and processes have now been found for the polymerization and copolymerization at low pressure of olefins in which the cocatalyst is also prepared from a solid support comprising alumina but in which there are obtained polymers of relatively low average molecular weight with very high productivities.

The present invention comprises novel catalysts and cocatalysts for use in the polymerization and copolymerization of $\alpha$-olefins, to a process for using such catalysts to polymerize and copolymerize $\alpha$-olefins, and to the process of making such cocatalysts. The $\alpha$-olefins are polymerized or copolymerized in the presence of a catalytic amount of a catalyst system comprising an organometallic compound of a metal of Groups Ia, IIa, IIb, IIIa, or IVa of the Periodic Table and a cocatalyst comprising the reaction product of a halogenated alumina and a derivative of a transistion metal of Groups IVb, Vb, and VIb of the Periodic Table, said halogenated alumina being formed by halogenating a complex oxide of aluminum and at least one other metal.

DETAILED DESCRIPTION

The complex oxides used in accordance with the invention are complex oxides of aluminum and of one or more other metals which may be any metals desired. Metals other than aluminum are generally chosen among the metals of Groups Ia, Ib, IIa, IIb, IIIa, IVa, IVb, Va, Vb, VIb, VIIb, and VIIIb of the Periodic Table. However, it is preferred to use magnesium, calcium, zinc, manganese, iron, nickel, cobalt, tin, and/or silicon. The best results are obtained with magnesium.

In the starting complex oxides, the amount of aluminum present is such that the ratio Al/M of amount of aluminum Al to the total amount of the other metals M is comprised between 0.01 and 100 gram-atom/gram-atom. Preferably, this ratio is comprised between 0.10 and 10. The best results are obtained when it is comprised between 0.25 and 5.

Excellent results have been noted with complex aluminum and magnesium oxides where the Al/M ratio is equal to about 2. These complex oxides correspond to the general formula $MgO.Al_2O_3$.

The exact chemical structure of the complex oxides used in accordance with the invention need not necessarily be well known and is, moreover, unimportant. All that is necessary is that the criteria discussed above be met. All the complex oxides defined hereinabove are suitable, be they natural or synthetic, whether or not they correspond to a well-defined chemical formula and whatever their nature may be.

The methods which can be used for the preparation of complex oxides are well known. They can all be used. For example, the so-called co-precipitation technique has always given satisfactory results. It consists in placing in solution water-soluble salts of aluminum and other metals in quantities such that the desired Al/M ratio for the complex oxide is achieved in the solution. As soluble salts, use is normally made of nitrates, chlorides and acetates. Then, an alkaline substance such as ammonia or sodium bicarbonate in aqueous solution is progressively added to the solution. There is started in this way the formation of a solid precipitate which, after pyrolysis, finally gives the complex oxides to be used in accordance with the invention.

According to the method used for their preparation and the conditions of pyrolysis, complex oxides may contain, in addition to aluminum, other metals and oxygen, residual radicals of the preparation (hydroxyls or carbonates, for example) or water. The latter do not hinder, provided they do not exceed 5% by weight of the total.

When the complex oxides of the invention are prepared by a method which ends up in the pyrolysis of a thermally decomposable complex compound, this pyrolysis is carried out at a temperature comprised between 100° and 1000°C., and preferably between 300° and 700°C. The best results have been noted between 300° and 500°C. Pyrolysis may be carried out as desired in air, nitrogen or any other insert atmosphere. Pressure is not critical; however, it is preferred to operate at atmospheric pressure or possibly at a reduced pressure, for reasons of convenience. The length of time is not critical either. Generally, it exceeds one hour and preferably four hours. The continuance of the treatment beyond 24 hours generally brings no further advantages.

The complex oxides preferably used within the scope of the present invention exhibit a high internal porosity. In other words, the volume of the pores constitutes a substantial proportion of the total volume of the particles. Generally, internal porosity is characterized in the ratio of pore volume to weight of matter. Use is made preferably of complex oxides the internal porosity of which is in excess of 0.3 cm$^3$/g. and, more particularly, in excess of 0.7 cm$^3$/g. The best results are obtained with complex oxides with an internal porosity greater than 1 cm³/g.

These complex oxides of high internal porosity have in general a specific area greater than 100 m²/g., which may reach 500 m²/g.

The complex oxides of the invention are used, preferably, in the form of particles of homogeneous composition. The utilization of mixtures of particles of alumina and of particles of oxides of other metals does not fall within the scope of the present invention.

The size of the particles is not critical. For reasons of convenience, it is, however, preferred to use particles the mean diameter of which is comprised between 1 and 500 $\mu$ and, preferably, between 40 and 200 $\mu$. In addition, the morphology of the polymer and its flowability are improved when use is made of complex oxides having particles of regular form. It is also preferred to use particles the granulometric curve of which is very close so as to obtain grains of polymer the granulometry of which is also close.

According to the present invention, the complex oxides are subjected to a halogenation treatment so as to form halogenated aluminas. The latter have, preferably, a halogen/ aluminum atomic ratio between 0.01 and 1. The best results are obtained when this ratio is comprised between 0.06 and 0.30 and, more particularly, between 0.10 and 0.15.

The halogenation treatment is carried out with the same halogenation agents and under the same conditions as set forth in our parent application. Fluorination is preferred. All the known fluorinating agents may be used to carry out the treatment. Among those frequently employed are elemental fluorine, oxyfluorides of non-metals, non-metal fluorides, and metal fluorides. It may also be followed or be combined with an activation treatment. The latter is also performed under the same conditions as in our parent application.

The preparation of the cocatalyst in accordance with the invention is effected with the same derivatives of the metals of Groups IVb, Vb, and VIb of the Periodic Table and under the same conditions as in our parent application. The cocatalysts of the present invention are obtained by reacting a fluorinated alumina with the derivatives of a transition metal. These derivatives are preferably selected from among the compounds of titanium, zirconium, vanadium and chromium. As derivative, one may use the halides, oxyhalides, alkoxyhalides, oxyalkoxides and alkoxides.

The elementary analysis of the cocatalyst in accordance with the invention shows that they are characterized in a content in metals of the Groups IVb, Vb, and VIb chemically fixed higher than 10 mg/g. and, in general, than 15 mg/g. These contents are higher than those which it is possible to attain by operating in accordance with our parent application.

The organometallic compounds entering into the composition of the catalytic systems in accordance with the invention are the same as those described in our parent application. The same applies to olefins to which the process of the invention relates and to the operational conditions of the polymerization.

The process of the invention makes it possible to manufacture polyolefins with remarkably high productivities. Thus, in the homopolymerization of ethylene, the productivity expressed in grams of polyethylene per gram of catalyst component is higher than 1000. The catalyst components prepared starting from fluorinated aluminas are particularly productive. Productivity may reach 1200 and even 1500 g. PE/g. of catalyst component. That is why, as in the process described in our parent application, polymers must not be purified.

The polyolefins prepared according to the process of the present invention are characterized in a relatively low average molecular weight, and, therefore, by a relatively high melt index. The latter, measured under normal charge according to the ASTM D 1238-57 T standard, may be greater than 0.50 for polyethylene even if the polymerization is carried out under ordinary temperature and hydrogen concentration conditions. These normal conditions are those which make it possible to attain optimum productivities (of the order of 500 g. PE/g. catalyst component).

The polyolefins and, in particular, the polyethylenes prepared according to the process of the invention are very suitable for all the applications where they are molded by extrusion to manufacture objects which are used under extremely severe conditions as, for example, under high pressure or in contact with substances capable of promoting stress cracking.

The invention will be further described in connection with the following examples which are set forth for the purposes of illustration only and are not to be construed as limiting the scope thereof in any manner.

EXAMPLES 1 to 6

Use is made of a complex oxide of general formula $MgO.Al_2O_3$ which is characterized by an internal porosity of 2 cm³/g. approximately and a specific area of 300 m²/g.

100 g. of this complex oxide are mixed with 6 g. of $NH_4F$ and the mixture is heated to temperatures shown in Table A. The temperature is held constant for 5 hours.

Fluorinated aluminas are obtained, the specifications of which are shown in Table A.

5 g. of the fluorinated aluminas thus prepared are suspended in 25 cm³ $TiCl_4$, and the whole is heated with strong agitation for 1 hour. The solid product of the reaction is separated, and it is washed with hexane until the disappearance of every trace of chlorine. Then, it is dried in a current of dry nitrogen.

The elementary analysis of the cocatalyst is given in Table A.

Various amounts of catalyst element (see Table A) are suspended in 500 cm³ of hexane in a stainless steel 1500 cm³. reactor provided with a blade agitator. 100 mg. of tri-isobutylaluminum are added.

The temperature is raised to 85°C. and ethylene is introduced at a partial pressure of 10 kg/cm², and hydrogen is also introduced at a partial pressure of 4 kg/cm². Polymerization is continued for 1 hour, maintaining the partial pressure of ethylene constant by the continuous introduction of ethylene.

After the degassing of the autoclave, the amounts of polyethylene shown in Table A are collected.

TABLE A

| Particular Conditions | Ex. 1 | Ex. 2 | Ex. 3 | Ex. 4 | Ex. 5 | Ex. 6 |
|---|---|---|---|---|---|---|
| Fluorination Temperature (°C.) | 700 | 650 | 600 | 500 | 400 | 300 |

TABLE A-continued

| Particular Conditions | Ex. 1 | Ex. 2 | Ex. 3 | Ex. 4 | Ex. 5 | Ex. 6 |
|---|---|---|---|---|---|---|
| Al Content of the Fluorinated Alumina mg/g. | 382 | 361 | 343 | 341 | 352 | 342 |
| F Content of the Fluorinated Alumina mg/g. | 44 | 50 | 43 | 45 | 37 | 36 |
| F/Al Atomic Ratio of the Fluorinated Alumina Gram-Atom/Gram-Atom | 0.16 | 0.19 | 0.18 | 0.18 | 0.15 | 0.15 |
| Ti Content of the Cocatalyst mg/g. | 12 | 15 | 17 | 14 | 14 | 16 |
| Cl Content of the Cocatalyst mg/g. | 76 | 88 | 128 | 157 | 188 | 223 |
| F Content of the Cocatalyst mg/g. | 43 | 48 | 41 | 45 | 37 | 36 |
| F + Cl/Ti Atomic Ratio of the Cocatalyst Gram-Atom/Gram-Atom | 17.6 | 16.4 | 16.3 | 22.6 | 24 | 28.5 |
| Weight of Cocatalyst put into Operation mg. | 35 | 50 | 50 | 50 | 50 | 50 |
| Weight of PE Collected g. | 46 | 64 | 61 | 77 | 108 | 99 |
| Productivity g. PE/g. Cocatalyst | 1310 | 1280 | 1220 | 1540 | 2160 | 1980 |
| Specific Activity g. PE/h.g. Ti.kg/cm$^2$C$_2$H$_4$ | 10900 | 8500 | 7200 | 11000 | 15400 | 12400 |
| Melt Index g/10 min. | 0.04 | 0.02 | 0.11 | 0.47 | 0.73 | 1.21 |
| Melt Index Under Heavy Load g/10 min. | 2.54 | 1.90 | 8.15 | 24.46 | 33.76 | — |

The results shown in Table A show that the process of the invention supplies polyethylenes of relatively high average molecular weight with very high productivities.

EXAMPLE 7

This example is given for comparative purposes.

The starting oxide used is an alumina obtained by treating at 700°C. for 16 hours an α-type alumina monohydrate sold under the trade name of "KETJEN Grade B".

100 g. of this alumina are mixed with 6 g. of NH$_4$F and the mixture is heated to 700°C. for 5 hours.

A fluorinated alumina is obtained, the aluminum content of which is 504 mg/g. and the fluorine content of which corresponds to an atomic ratio of 0.17 approximately.

A cocatalyst is then prepared as in Examples 1 to 6. Its elementary analysis shows that it contains 6.2 mg/g. titanium, 59 mg/g. chlorine and 21 mg/g. fluorine. The F + Cl/Ti ratio is about 21.2

A polymerization test is carried out as in Examples 1 to 6 by using 300 mg. of catalyst component. However, the partial ethylene pressure is 5 kg/cm$^2$ and that of the hydrogen is 10 kg/cm$^2$. 120 g. of polyethylene are collected. The productivity is, therefore, 400 g. PE/g. of cocatalyst and specific activity is 12,900 g. PE/h.g Ti.kg/cm$^2$ C$_2$H$_4$.

The melt index of the polyethylene collected is 0.35 g/10 min.

The comparison with Example 4 shows that it is possible to obtain polyethylene of relatively high melt index with the catalyst components described in our parent application, but that it is necessary to operate with very high relative hydrogen concentrations, which has as a consequence a very substantial fall in productivity.

EXAMPLE 8

Use is made of a complex oxide of general formula MgO.3/2(Al$_2$O$_3$) which is characterized in an internal porosity of about 2 cm$^3$/g. and a specific area of 296 m$^2$/g.

100 g. of this oxide are mixed with 4 g. of NH$_4$F and the mixture is heated to 700°C. This temperature is held constant for 5 hours.

A fluorinated alumina is obtained, the aluminum content of which is 465 mg/g. and the fluorine content 42 mg/g. The F/Al atomic ratio is, therefore, 0.13.

The preparation of the cocatalyst is then proceeded with as in Examples 1 to 6. The elementary analysis of this component reveals that it contains:
titanium: 25 mg/g.
chlorine: 91 mg/g.
fluorine: 40 mg/g.

The F + Cl/Ti atomic ratio is, therefore, equal to 13.

Then, a polymerization test is carried out under the same conditions as in Examples 1 to 6 using 154 mg. of catalyst component.

153 g. are collected of a polyethylene characterized in a melt index of 0.76 g/10 min. The productivity is, therefore, 1000 g. PE/g. cocatalyst and the specific activity is 4000 g. PE/h.g Ti Kg/cm$^2$ C$_2$H$_4$.

EXAMPLE 9

Use is made of a complex oxide of general formula CaO.Al$_2$O$_3$ which is characterized in an internal porosity of about 1.5 cm$^3$/g. and a specific surface of 190 m$^2$/g.

100 g. of this oxide are mixed with 4 g. NH$_4$F and the mixture is heated to 700°C. This temperature is held constant for 5 hours.

A fluorinated alumina is obtained, the aluminum content of which is 410 mg/g. and the fluorine content 58 mg/g. The F/Al atomic ratio is, therefore, 0.20.

The preparation of the cocatalyst is then proceeded with as in Examples 1 to 6. The elementary analysis of this component reveals that it contains:
titanium: 9.7 mg/g.
chlorine: 74.0 mg/g.
fluorine: 57 mg/g.

The F + Cl/Ti atomic ratio is, therefore, equal to 25.

A polymerization test is carried out under the same conditions as in Examples 1 to 6 using 105 mg. of catalyst component.

37 g. are collected of a polyethylene characterized in a melt index measured under heavy load of 0.48. Productivity is, therefore, 360 g. PE/g. of cocatalyst and the specific activity is 3600 g. PE/h.g Ti. Kg/cm$^2$ C$_2$H$_4$.

EXAMPLE 10

Use is made of a complex oxide of general formula Al$_2$O$_3$.4(SiO$_2$) which is characterized in an internal porosity of 1.8 cm$^3$/g. and a specific area of 160 m$^2$/g.

100 g. of this oxide are mixed with 2 g. of NH$_4$F and the mixture is heated to 600°C. This temperature is held constant for 5 hours.

A fluorinated alumina is obtained, the aluminum content of which is 340 mg/g. and the fluorine content 12 mg/g. The F/Al atomic ratio is, therefore, 0.05.

The preparation of the cocatalyst is then proceeded with as in Examples 1 to 6. The elementary analysis of this component reveals that it contains:

titanium: 6.4 mg/g.
chlorine: 15 mg/g.
fluorine: 9.6 mg/g.

The F + Cl/Ti atomic ratio is, therefore, equal to 7.

149 mg. of catalyst component are suspended in 500 cm$^3$ of hexane in the reactor used in Examples 1 to 6. 100 mg. triisobutyl-aluminum are added.

The temperature is raised to 85°C. and ethylene is introduced under a partial pressure of 8 kg/cm$^2$, also, hydrogen under a partial pressure of 15 kg/cm$^2$. Polymerization is continued for 1 hour, maintaining the total pressure constant by the continuous addition of ethylene.

7 g. are collected of a polyethylene characterized in a melt index of 0.06 g/10 min. Productivity is, therefore, 47 g. PE/g. of cocatalyst and the specific activity is 920 g. PE/h.g Ti. Kg/cm$^2$ C$_2$H$_4$.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. A cocatalyst for use with an organometallic compound of a metal selected from the Groups Ia, IIa, IIb, IIIa and IVa of the Periodic Table to catalyze the polymerization and copolymerization of α-olefins consisting essentially of the reaction product of a fluorinated complex oxide having the general formula MgO.Al$_2$O$_3$ with a derivative of titanium selected from the group consisting of halides, oxyhalides, alkoxyhalides, oxyalkoxides and alkoxides, said complex being fluorinated at a temperature of from about 100°C. to about 700°C. and said fluorinated complex having a F/Al atomic ratio of between 0.1 and 0.15.

2. The cocatalyst of claim 1 wherein the complex oxide is fluorinated at between about 300°C. and 400°C. and the F/Al atomic ratio is about 0.15.

3. A catalyst for the polymerization and copolymerization of α-olefins comprising a trialkyl aluminum and a cocatalyst consisting essentially of the reaction product of a fluorinated complex oxide having the general formula MgO.Al$_2$O$_3$ with a derivative of titanium selected from the group consisting of halides, oxyhalides, alkoxyhalides, oxyalkoxides and alkoxides, said complex being fluorinated at a temperature of from about 100°C. to about 700°C. and said fluorinated complex having a F/Al atomic ratio of between 0.1 and 0.15.

4. The catalyst of claim 1 wherein the complex oxide is fluorinated at between about 300°C. and 400°C. and the F/Al atomic ratio is about 0.15.

5. The process for the polymerization and copolymerization of α-olefins in the presence of the catalytic system of claim 3.

6. The process for the polymerization and copolymerization of α-olefins in the presence of the catalytic system of claim 4.

7. A method for making the cocatalyst of claim 1 comprising the steps of reacting a complex oxide having the general formula MgO.Al$_2$O$_3$ with a fluorinating agent at a temperature of from about 100°C to about 700°C for a time sufficient to give a fluorinated complex oxide having an atomic ratio of fluorine/aluminum of from about 0.1 to 0.15 and reacting said fluorinated complex oxide with a derivative of titanium selected from the group consisting of halides, oxyhalides, alkoxyhalides, oxyalkoxides and alkoxides for a time sufficient to chemically fix the titanium derivative to the fluorinated complex.

8. The method according to claim 7 wherein the complex oxide is fluorinated at between about 300°C and 400°C and the fluorine/aluminum atomic ratio is about 0.15.

* * * * *